(12) United States Patent
Liao et al.

(10) Patent No.: US 7,529,084 B2
(45) Date of Patent: May 5, 2009

(54) STORING MECHANISM

(75) Inventors: Hung-Ta Liao, Taipei City (TW);
Chih-Ping Chen, Taipei City (TW);
Ku-Feng Chen, Taipei City (TW)

(73) Assignee: Compal Electronics, Inc., Taipei (TW)

( * ) Notice: Subject to any disclaimer, the term of this patent is extended or adjusted under 35 U.S.C. 154(b) by 312 days.

(21) Appl. No.: 11/309,207

(22) Filed: Jul. 13, 2006

(65) Prior Publication Data

US 2007/0133165 A1    Jun. 14, 2007

(30) Foreign Application Priority Data

Dec. 8, 2005   (TW) .............................. 94143357 A

(51) Int. Cl.
*H05K 5/00* (2006.01)
*H05K 7/00* (2006.01)
*G06F 1/16* (2006.01)

(52) U.S. Cl. ..................................................... 361/685
(58) Field of Classification Search .................. 361/685
See application file for complete search history.

(56) References Cited

U.S. PATENT DOCUMENTS

| 4,208,681 | A | * | 6/1980 | Hatchett .................. 360/99.06 |
| 4,352,492 | A | * | 10/1982 | Smith .......................... 463/44 |
| 4,426,122 | A | * | 1/1984 | Lainez et al. ................ 361/683 |
| 4,454,599 | A | * | 6/1984 | Tsuchiya .................... 720/647 |
| 4,509,158 | A | * | 4/1985 | Kang ....................... 369/77.21 |
| 4,607,361 | A | * | 8/1986 | Schuitmaker et al. ....... 720/607 |
| 4,724,310 | A | * | 2/1988 | Shimamura et al. ......... 235/483 |
| 4,926,032 | A | * | 5/1990 | Shimamura et al. ......... 235/441 |
| 5,066,241 | A | * | 11/1991 | Hills ........................... 439/260 |
| 5,067,121 | A | * | 11/1991 | Einhaus ...................... 720/612 |
| 5,211,566 | A | * | 5/1993 | Bates et al. ................... 439/66 |
| 5,229,919 | A | * | 7/1993 | Chen ........................... 361/685 |
| 5,305,180 | A | * | 4/1994 | Mitchell et al. ............. 361/685 |
| 5,319,519 | A | * | 6/1994 | Sheppard et al. ............ 361/685 |
| 5,408,459 | A | * | 4/1995 | Kawaguchi et al. ......... 720/647 |
| 5,442,513 | A | * | 8/1995 | Lo .............................. 361/685 |
| 5,454,080 | A | * | 9/1995 | Fasig et al. ................. 710/302 |
| 5,466,166 | A | * | 11/1995 | Law et al. ................... 439/159 |
| 5,507,658 | A | * | 4/1996 | Ho .............................. 439/159 |
| 5,518,418 | A | * | 5/1996 | Larabell ..................... 439/505 |
| 5,537,378 | A | * | 7/1996 | Uehara et al. ............ 369/30.75 |
| 5,541,809 | A | * | 7/1996 | Kakizaki et al. ............ 361/683 |
| 5,587,854 | A | * | 12/1996 | Sato et al. ................ 360/97.01 |
| 5,625,612 | A | * | 4/1997 | Tozune et al. ............... 720/635 |

(Continued)

*Primary Examiner*—Anatoly Vortman
*Assistant Examiner*—Quinn Hunter
(74) *Attorney, Agent, or Firm*—Jianq Chyun IP Office

(57) ABSTRACT

A storing mechanism suitable for being disposed in an electronic device is provided, which is used to store a first hard disk with a first thickness or a second hard disk with a second thickness. The storing mechanism includes a first module, a second module and a restoring element. The first module includes a base and a lever. The lever having a leaned portion is pivoted to the base. Additionally, the second module includes a tray and a slide. The tray is glidingly disposed on the base, and has a stopper for being limited to the leaned portion, so as to limit the shift of the tray relative to the base. The slide is glidingly disposed on the tray. Moreover, the restoring element is disposed between the base and the tray for making the delocalized tray move back to the original location.

9 Claims, 18 Drawing Sheets

U.S. PATENT DOCUMENTS

| | | | |
|---|---|---|---|
| 5,668,793 A * | 9/1997 | Ogawa et al. | 720/648 |
| 5,694,290 A * | 12/1997 | Chang | 361/685 |
| 5,898,660 A * | 4/1999 | Serizawa | 720/738 |
| 6,262,864 B1 * | 7/2001 | Boe | 360/99.06 |
| 6,580,603 B1 * | 6/2003 | Resnick | 361/683 |
| 6,954,939 B2 * | 10/2005 | Yamagishi et al. | 720/635 |
| 2002/0145366 A1 * | 10/2002 | Yang | 312/223.2 |
| 2003/0214788 A1 * | 11/2003 | Bang-Heng | 361/727 |

* cited by examiner

STORING MECHANISM

CROSS-REFERENCE TO RELATED APPLICATION

This application claims the priority benefit of Taiwan application serial no. 94143357, filed on Dec. 8, 2005. All disclosure of the Taiwan application is incorporated herein by reference.

BACKGROUND OF THE INVENTION

1. Field of Invention

The present invention relates to a storing mechanism, and more particularly to a storing mechanism for a removable hard disk.

2. Description of Related Art

Recently, as the rapid progress of the electronic technology, the electronic device is developed towards the trend of being small and light, and thereby becoming portable. The common portable electronic device is, for example, the mobile phone, the notebook, the personal digital assistant (PDA), or the handheld computer. The above portable electronic device may expand their performance by externally connecting to other peripheral products, such as compact disc-recordable machine (CD-R machine), wireless network card, removable hard disk and the like.

FIG. 1 is a schematic view of a conventional storing box and a removable hard disk with the first specification that the conventional storing box is suitable to be applied in. Referring to FIG. 1, the conventional removable hard disk 101 is suitable for being stored in a storing box 100. Generally speaking, the storing box 100 has a connector (not shown), and the removable hard disk 101 may be electrically connected to an electronic device via the storing box 100 through plugging a connecting terminal (not shown) to the connector within the storing box 100. The storing box 100 is not only used as a medium for connecting the removable hard disk 101 to other electronic devices, but also used for partially protecting the removable hard disk 101.

FIG. 2 is a schematic view of the storing box of FIG. 1 and a removable hard disk with the second specification. Referring to FIG. 1 and FIG. 2, the removable hard disks 101 and 102 have different specifications. For the size of the disk, the removable hard disks 101 and 102 are 1.8 inch and 2.5 inch respectively. Moreover, for the external size, the overall thickness and the length of the removable hard disk 102 are both larger than that of the removable hard disk 101.

It should be noted that, after the shorter removable hard disk 101 is plugged into the storing box 100, the part being exposed outside the storing box 100 is quite short, so the appearance of the storing box 100 is not affected, and most part of the removable hard disk 101 is protected by the storing box 100. However, after the longer removable hard disk 102 is plugged into the storing box 100, the part being exposed outside the storing box 100 is relatively long, so the appearance of the storing box 100 is ruined, and most part of the removable hard disk 102 may not be protected by the storing box 100. Therefore, for enhancing the beauty of the appearance and protecting the structure, the conventional storing box 100 is not suitable for storing the longer removable hard disk 102.

SUMMARY OF THE INVENTION

An objective of the present invention is to provide a storing mechanism, such that removable hard disks with different sizes are stored in the same storing box, and the length of the exposed parts of the removable hard disks stored within the storing box is the same.

To achieve the above or other objectives, the present invention provides a storing mechanism suitable for being disposed within an electronic device. The storing mechanism is used to store a first hard disk with a first thickness or a second hard disk with a second thickness. The storing mechanism of the present invention includes a first module, a second module and a first restoring element. The first module includes a base and a lever. The lever having a leaned portion is pivoted to the base. Additionally, the second module includes a tray and a slide. The tray is glidingly disposed on the base, and has a stopper. The stopper is disposed corresponding to the leaned portion and used to be limited to the leaned portion, so as to limit the shift of the tray relative to the base. The slide is glidingly disposed on the tray. Moreover, the first restoring element, disposed between the base and the tray, is used to make the delocalized tray move back to its original location. When the first hard disk is located on the tray and is forced to move towards the slide under an external force, the first thickness of the first hard disk makes the first hard disk enter into the space between the tray and the slide, such that the first hard disk is coupled to a connector of the electronic device disposed on the tray. When the second hard disk is located on the tray and is forced to move towards the slide under the external force, due to the second thickness of the second hard disk, the second hard disk pushes the slide, such that the second hard disk is coupled to the connector, the slide pushed by the second hard disk raises the leaned portion of the lever, thereby releasing the limiting effect of the leaned portion to the stopper of the tray, thus, under an external force, the second hard disk, the tray and the slide move for a preset distance on the base.

In an embodiment of the present invention, the first restoring element is a constant force spring.

In an embodiment of the present invention, the length of the part of the stored first hard disk being exposed outside the electronic device is substantially equal to that of the part of the stored second hard disk being exposed outside the electronic device.

In an embodiment of the present invention, the first module further comprises a second restoring element disposed between the base and the lever, which is used for making the delocalized lever move back to its original location.

In an embodiment of the present invention, the second restoring element is a spring.

In an embodiment of the present invention, the second module further comprises a third restoring element disposed between the tray and the slide, which is used for making the delocalized slide move back to its original location.

In an embodiment of the present invention, the third restoring element is a spring.

In an embodiment of the present invention, the storing mechanism further comprises a first snapping portion, a second snapping portion and a fourth restoring element. The first snapping portion is disposed on the base, and the second snapping portion is pivoted on the tray. The second snapping portion is snapped to the first snapping portion after both the second hard disk and the tray have been forced to move for the preset distance on the base under an external force. Moreover, the fourth restoring element is disposed between the tray and the second snapping portion and is used to make the delocalized second snapping portion move back to its original location.

In an embodiment of the present invention, the fourth restoring element is a spring.

Based on the above descriptions, the present invention utilizes the thickness difference between different hard disks to make the base of the first module move or not move relative to the tray of the second module, thereby adjusting the depths for the hard disks with different thicknesses to enter into the storing mechanism of the present invention, thus, the lengths of the hard disks being exposed outside the storing mechanism are substantially the same.

In order to make aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic view of a conventional storing box and a removable hard disk with the first specification that the conventional storing box is suitable to be applied in.

DESCRIPTION OF EMBODIMENTS

The elements of the storing mechanism of the present invention and the operating methods are described below in great detail.

Figure 3:
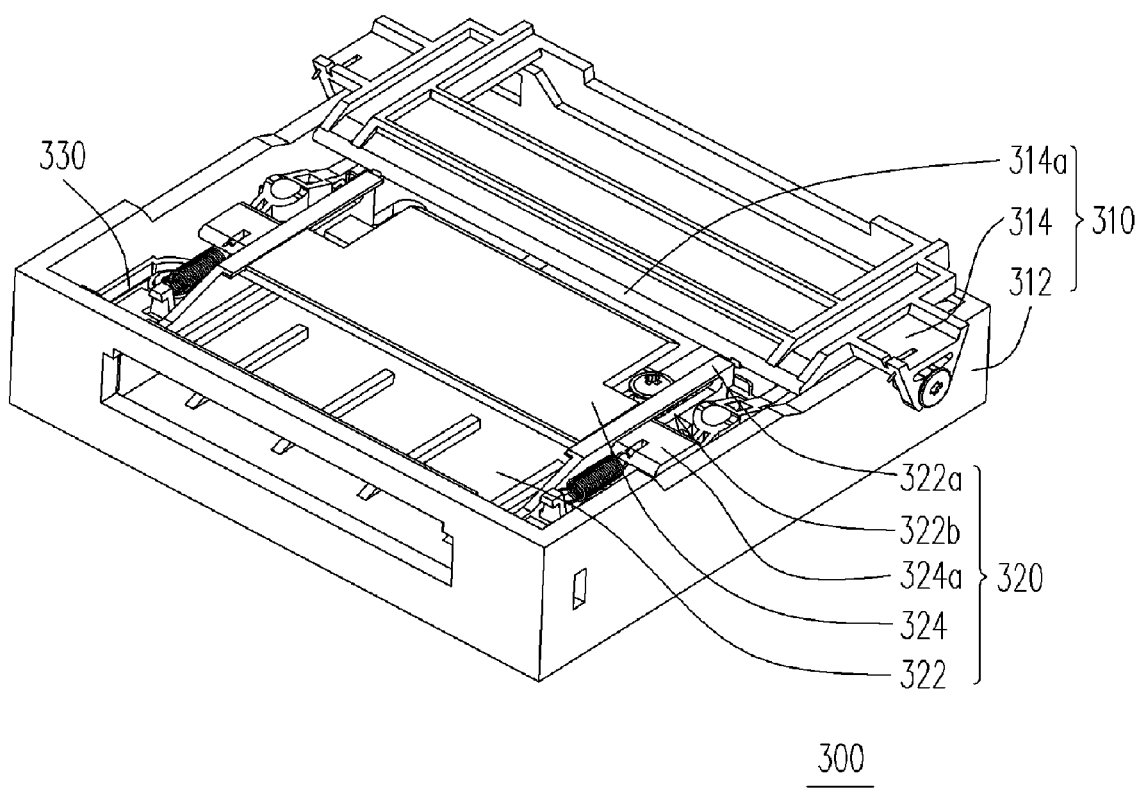
FIG. 3 is a schematic view of a storing mechanism according to an embodiment of the present invention.
Figure 4:
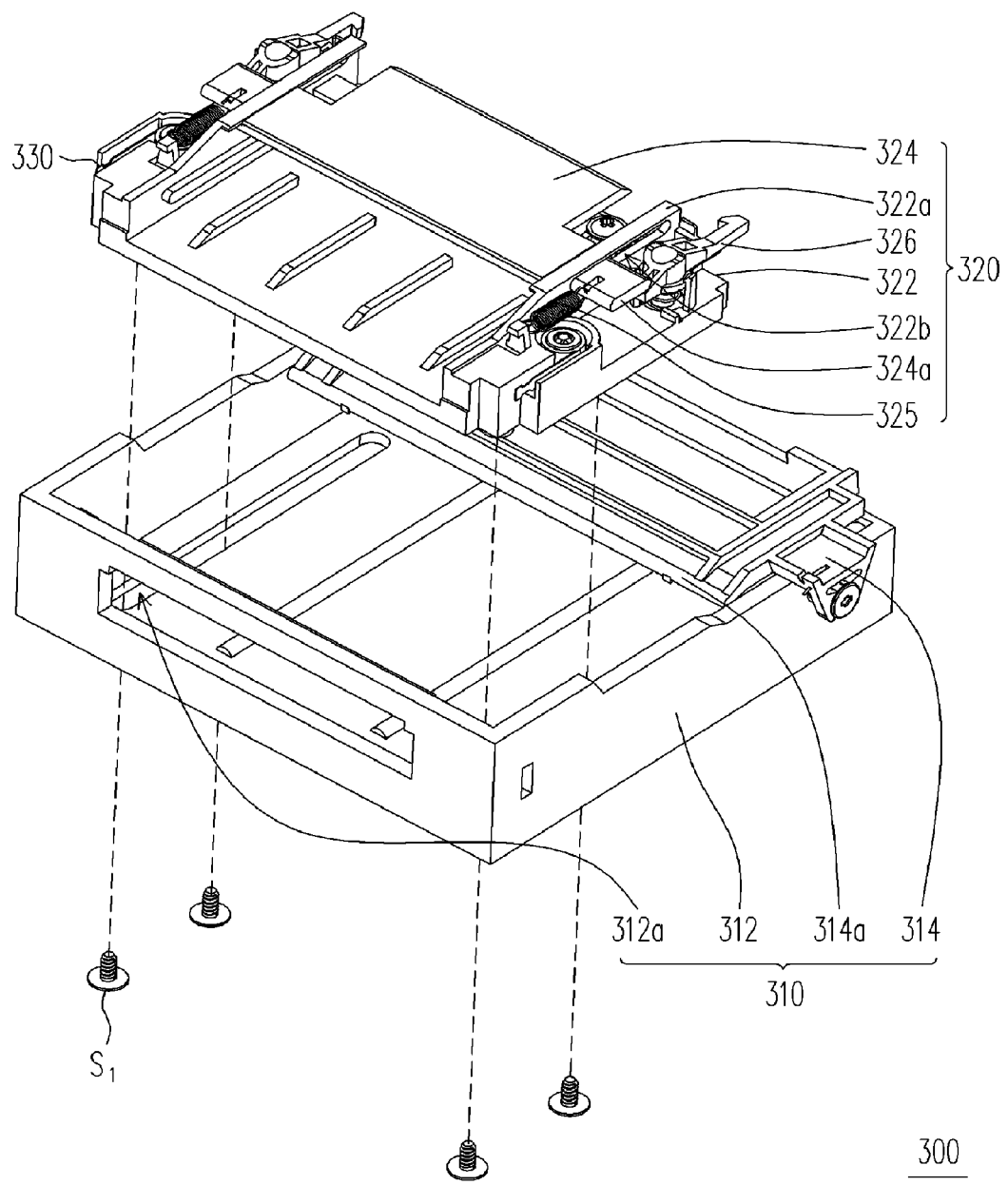
FIG. 4 is an exploded schematic view of the storing mechanism of FIG. 3.

FIG. 3 is a schematic view of a storing mechanism according to an embodiment of the present invention, and FIG. 4 is an exploded schematic view of the storing mechanism of FIG. 3. Referring to FIG. 3 and FIG. 4, the storing mechanism 300 of this embodiment is suitable for being disposed within an electronic device and the electronic device is used as a medium for electrically connecting the hard disk to the computer equipment. The storing mechanism 300 of this embodiment is suitable for storing and protecting hard disks with different sizes. The storing mechanism 300 comprises a first module 310, a second module 320 and a first restoring element 330.

The first module 310 comprises a base 312 and a lever 314, wherein the lever 314 is pivoted on the base 312. Moreover, the base 312 of the first module 310 further has a plurality of chutes 312a for the second module 312 to move along. Of course, the base 312 may also have other types of tracks, as long as the same function can be achieved, but not limited to the above chutes 312a.

The second module 320 comprises a tray 322 and a slide 324, wherein the tray 322 is glidingly disposed on the base 312 of the first module 310. In this embodiment, the tray 322 is glidingly disposed on the base 312 by a screw S1 and the chutes 312a. The tray 322 further has a stopper 322a corresponding to a leaned portion 314a of the first module 310. The stopper 322a is limited to the leaned portion 314a of the lever 314, so as to limit the shift of the tray 322 relative to the base 312. Moreover, the slide 324 is glidingly disposed on the tray 322. In this embodiment, the slide 324 comprises two lugs 324a coupled to two chutes 322b of the tray 322 respectively and glidingly disposed on the tray 322.

The first restoring element 330 is disposed between the base 312 and the tray 322. The first restoring element 330 is, for example, a constant force spring for providing a stable tension to make the delocalized tray 322 mildly move back to its original location. Till now, the main elements of the storing mechanism 300 of this embodiment have been substantially illustrated. Then, the first module 310 and the second module 320 of this embodiment are illustrated below in great detail with reference to the drawings.

Figure 5A:
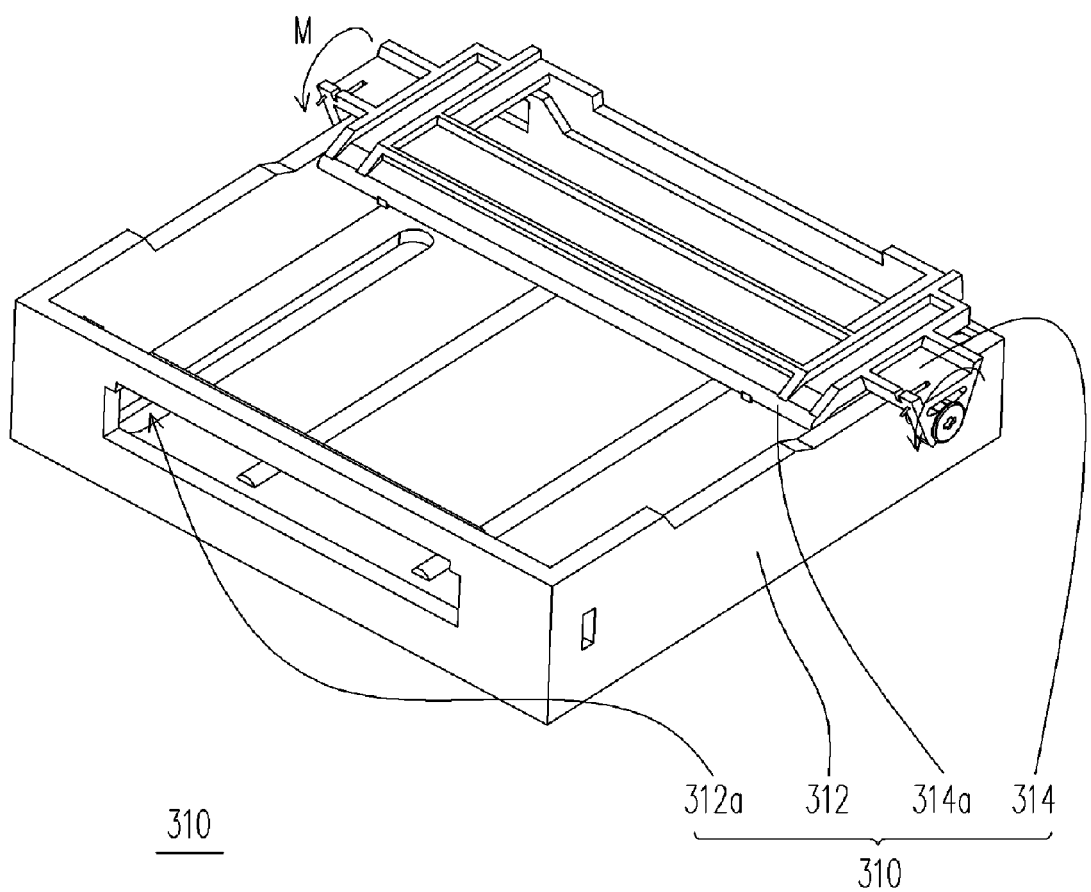
FIG. 5A is a schematic view of a first module of FIG. 4.
Figure 5B:
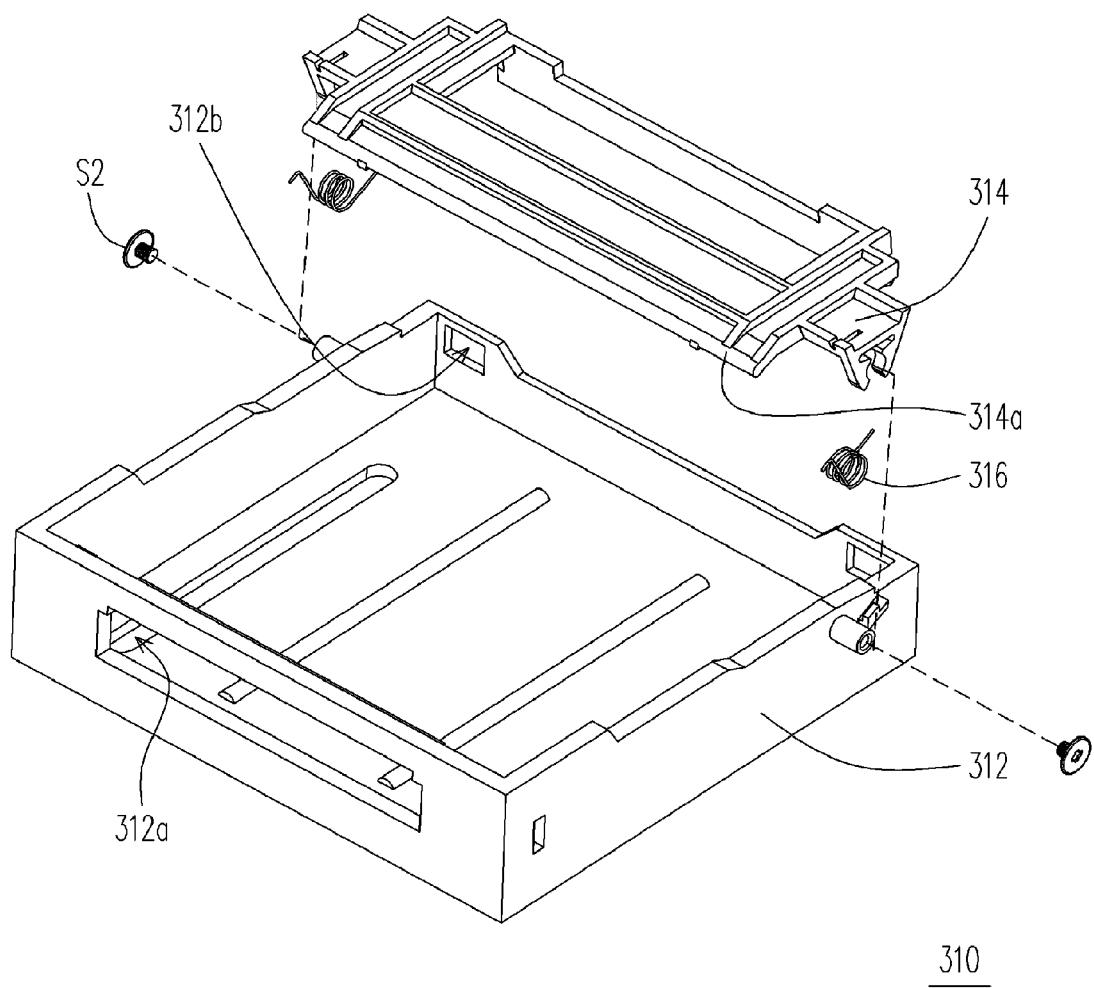
FIG. 5B is an exploded schematic view of the first module of FIG. 5A.

FIG. 5A is a schematic view of a first module of FIG. 4, and FIG. 5B is an exploded schematic view of the first module of FIG. 5A. Referring to FIG. 5A and FIG. 5B, the first module 310 of this embodiment further comprises a second restoring element 316 disposed between the base 312 and the lever 314, which is, for example, a spring. In this embodiment, the second restoring element 316 is disposed between the base 312 and the lever 314 by a bolt S2, for example. The main function of the second restoring element 316 is to provide a moment M to the lever 314 relative to the base 312, so as to temporarily fix the lever 314 on the base 312. It should be mentioned that, after the lever 314 is applied with an external force that is opposite to the direction of the moment M to rotate for an angle with the bolt S2 as the axle center, once the external force is removed from the lever 314, the delocalized lever 314 that has already rotated for such an angle is moved back to the original location due to being affected by the moment M of the second restoring element 316.

Figure 6A:
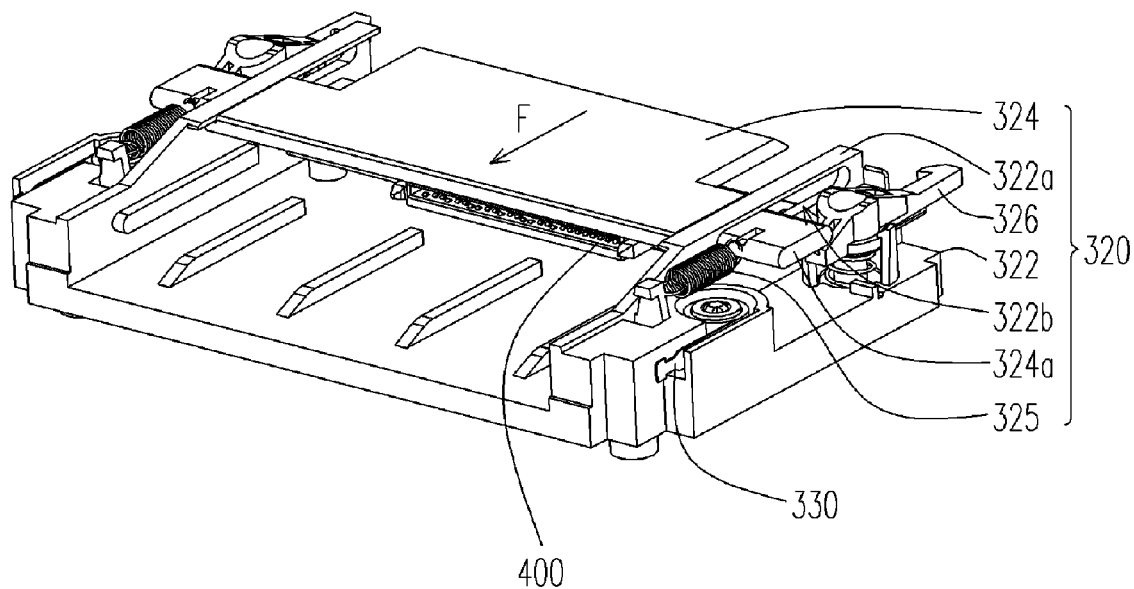
FIG. 6A is a schematic view of a second module of FIG. 4.
Figure 6B:
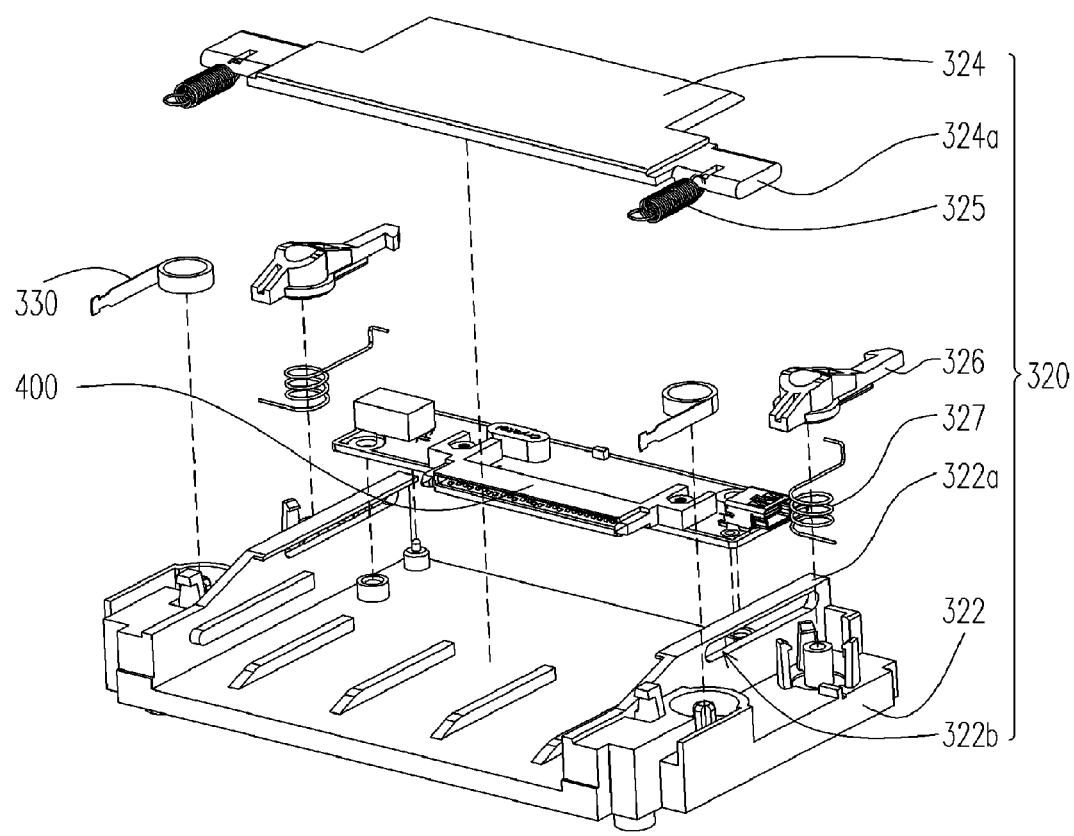
FIG. 6B is an exploded schematic view of the second module of FIG. 6A.

FIG. 6A is a schematic view of a second module of FIG. 4, and FIG. 6B is an exploded schematic view of the second module of FIG. 6A. Referring to FIG. 6A and FIG. 6B, the second module 320 of this embodiment further comprises a third restoring element 325 disposed between the tray 322 and the slide 324, which is, for example, a spring. The main function of the third restoring element 325 is to provide a tension F to the slide 324 relative to the tray 322, so as to temporarily fix the slide 324 on the tray 322. It should be mentioned that, after the slide 324 is applied with an external force to delocalize from the original location on the tray 322, once the external force is removed from the slide 324, the tension F makes the slide 324 move back to its original location on the tray 322. Moreover, the connector 400 of the electronic device used to be coupled to the connecting terminal of the hard disk is installed on the tray 322.

Referring to FIG. 5B, FIG. 6A and FIG. 6B, the storing mechanism 300 of this embodiment further comprises a plurality of first snapping portions 312b, a plurality of second snapping portions 326 and a plurality of fourth restoring elements 327. The first snapping portions 312b are disposed on the base 312 of the first module 310, as shown in FIG. 5B, and the second snapping portions 326 are respectively pivoted on the tray 322 of the second module 320 corresponding to the first snapping portions 312b, as shown in FIG. 6A and FIG. 6B. After the second module 320 has been assembled to the first module 310, the second snapping portions 326 are snapped to the first snapping portions 312b respectively. In this embodiment, the first snapping portions 312b are, for example, snapping holes, and the second snapping portions 326 are, for example, latches.

The fourth restoring elements 327 are disposed between the tray 322 and the second snapping portions 326 respectively and used for making the delocalized second snapping portions 326 move back to its original location. In this embodiment, the fourth restoring elements 327 are, for example, springs, and they respectively provide a spring force for the second snapping portions 326 to be snapped and make them move back to the original location.

Figure 7A:
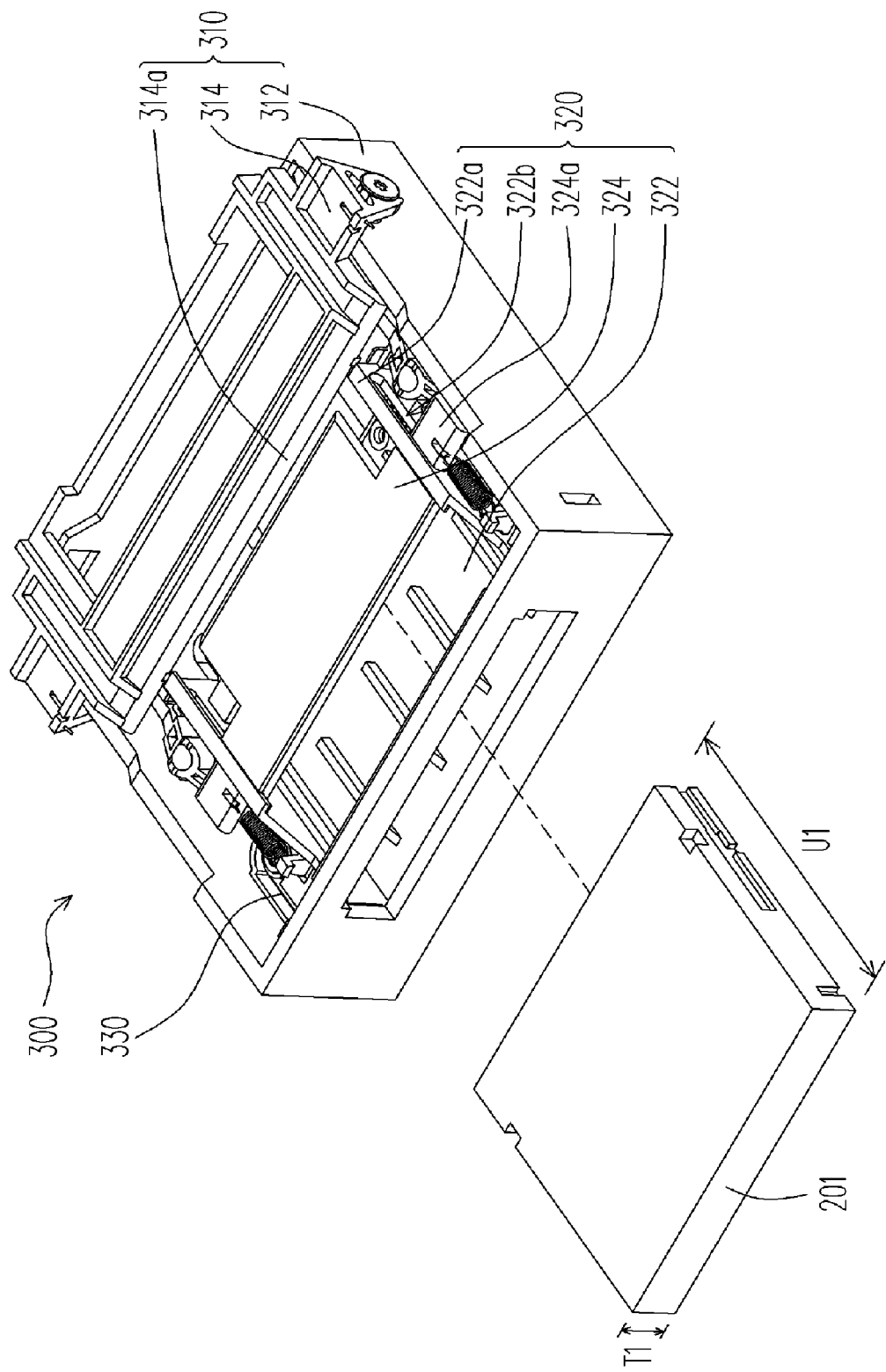
FIG. 7A and FIG. 7B are schematic flow charts when the storing mechanism of FIG. 3 is used to store the first hard disk.
Figure 7B:
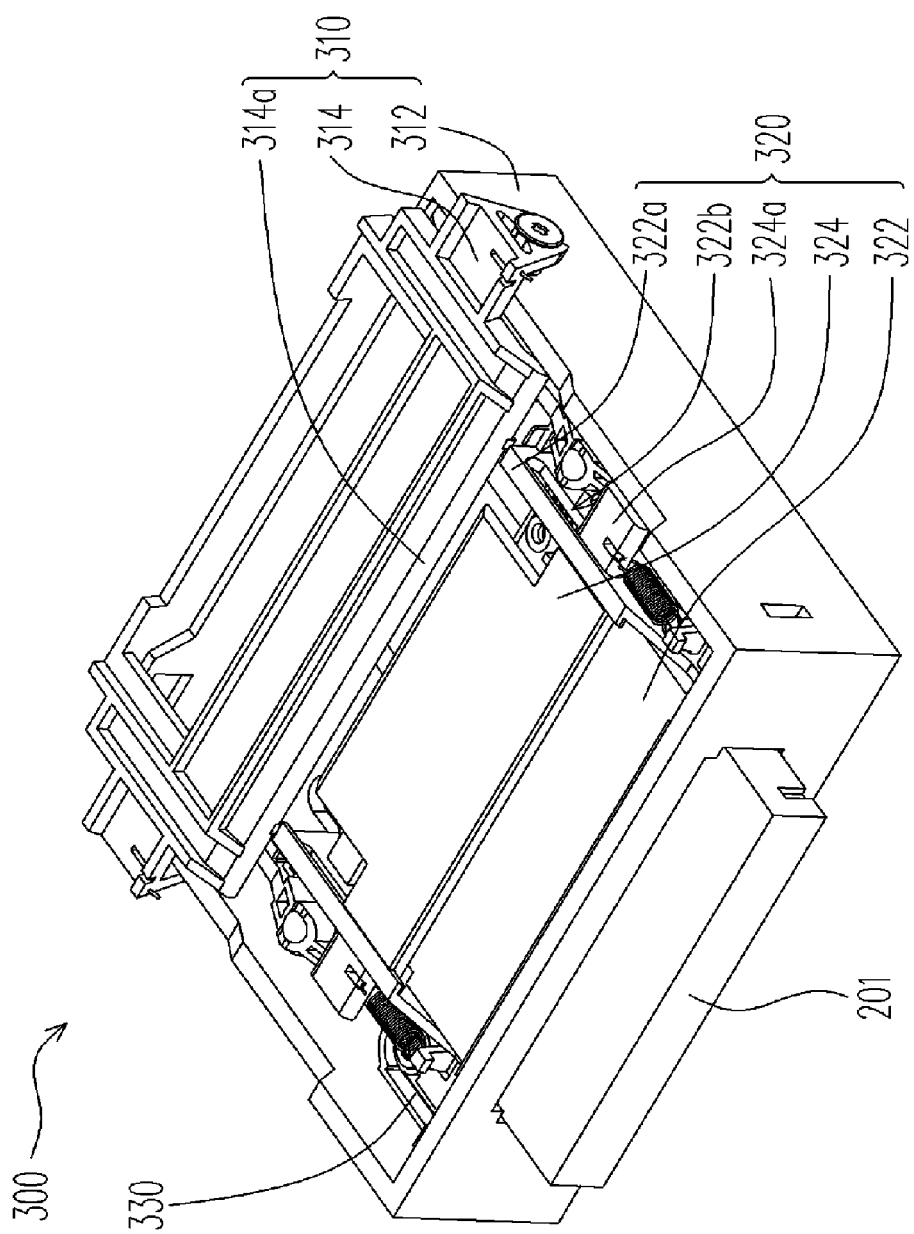
Figure 8A:
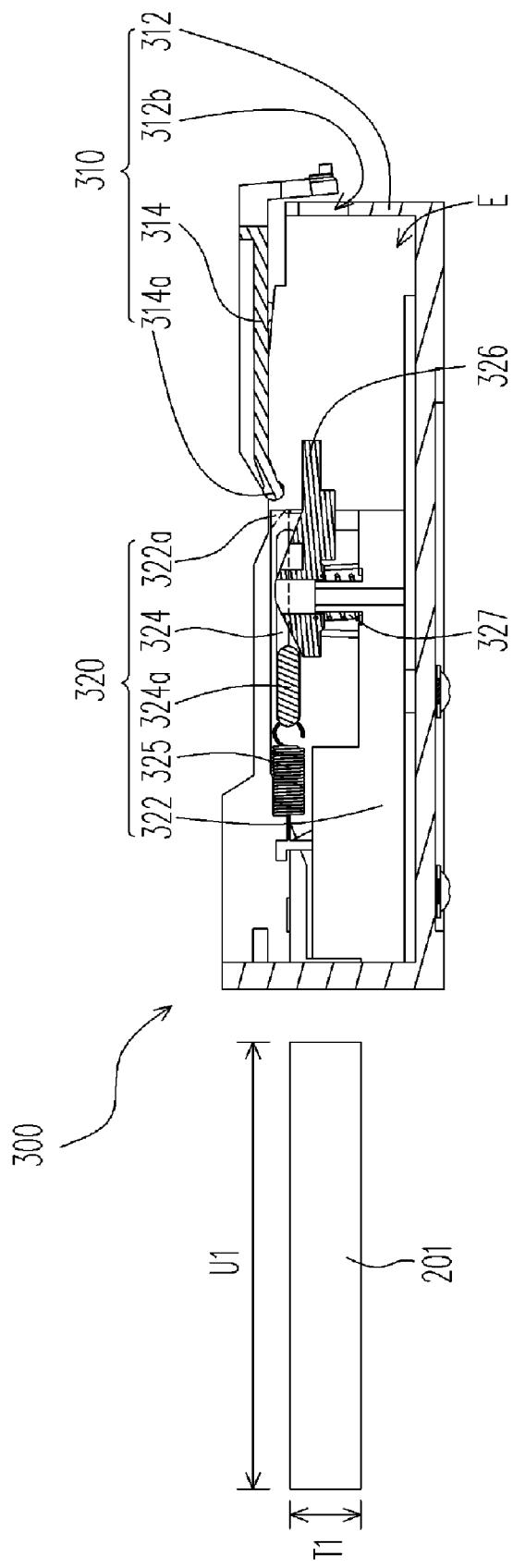
FIG. 8A and FIG. 8B are schematic cross-sectional views of FIG. 7A and FIG. 7B respectively.
Figure 8B:
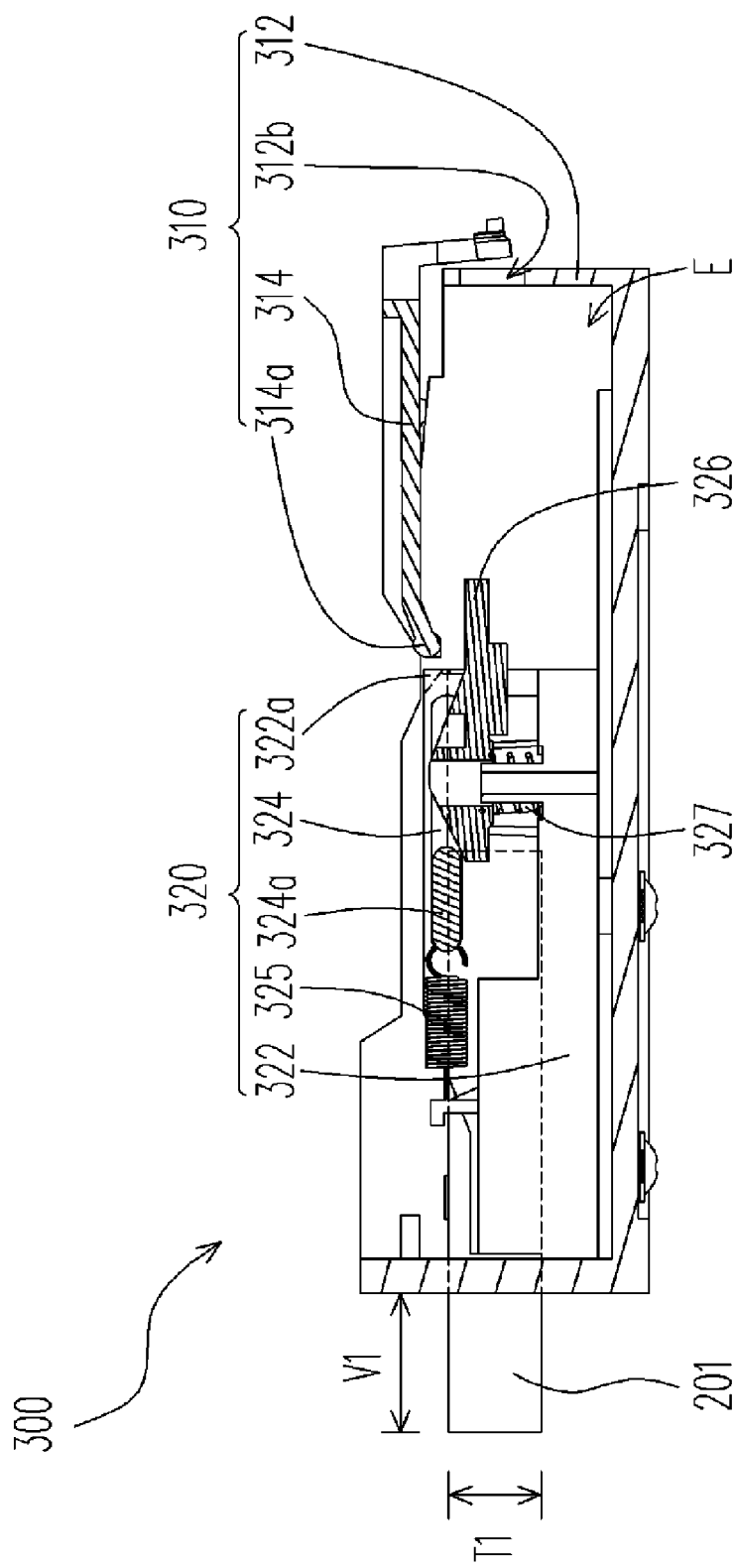

The operating process of the storing mechanism 300 of this embodiment is further illustrated below with reference to the drawings. FIG. 7A and FIG. 7B are schematic flow charts when the storing mechanism of FIG. 3 is used to store the first hard disk, and FIG. 8A and FIG. 8B are schematic cross-sectional views of FIG. 7A and FIG. 7B respectively. In order to clearly show the overall operating flow of the storing mechanism 300, a part of the elements is omitted in FIG. 8A and FIG. 8B.

Referring to FIG. 7A and FIG. 8A, the first hard disk 201 has a first thickness T1. In this embodiment, the first hard disk 201 is a removable hard disk with a specification of 1.8 inch. Then, referring to FIG. 7B and FIG. 8B, when the user plugs the first hard disk 201 into the storing mechanism 300, the first hard disk 201 is located on the tray 322 and is forced to move towards the slide 324 under an external force. The space between the slide 324 and the tray 322 allows the first hard disk 301 with the first thickness T1 to enter therein successfully, and makes the first hard disk 201 be coupled to the connector 400 of the external electronic device disposed on the tray 322 (as shown in FIG. 6B).

It should be noted that, the stopper 322a of the second module 320 may support against the leaned portion 314a of the first module 310, such that the second module 320 cannot enter into the space E (as shown in FIG. 5B). Moreover, most part of the first hard disk 201 is located within the storing mechanism 300, and protected by the storing mechanism 300. On the other aspect, the first hard disk 201 is partially exposed outside the storing mechanism 300 for an appropriate length V1 for the user to hold with hand, so the user easily draw out the first hard disk 201 from the storing mechanism 300.

Figure 9A:
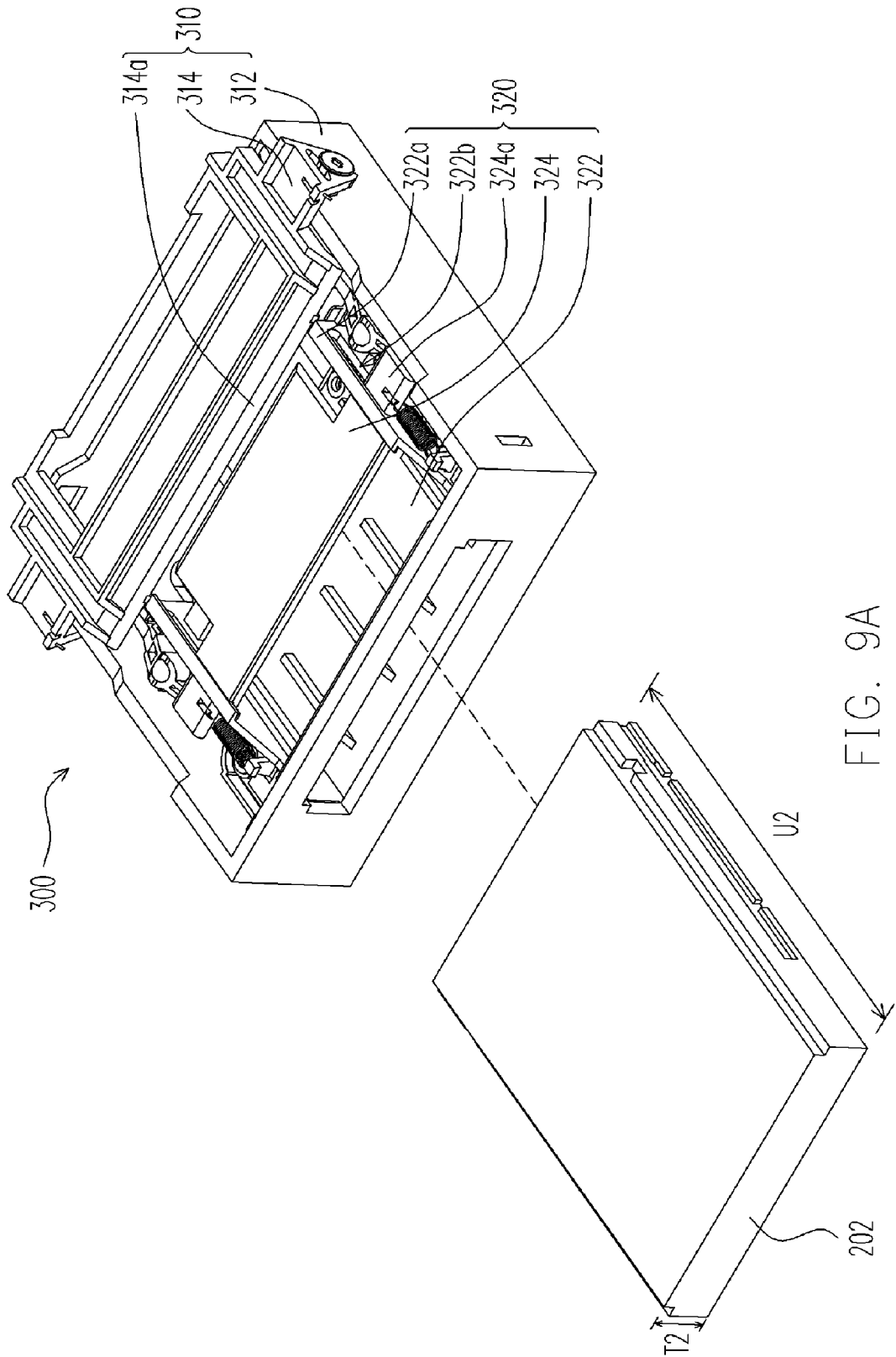
FIGS. 9A-9C are schematic flow charts when the storing mechanism of FIG. 3 is used to store the second hard disk.
Figure 9B:
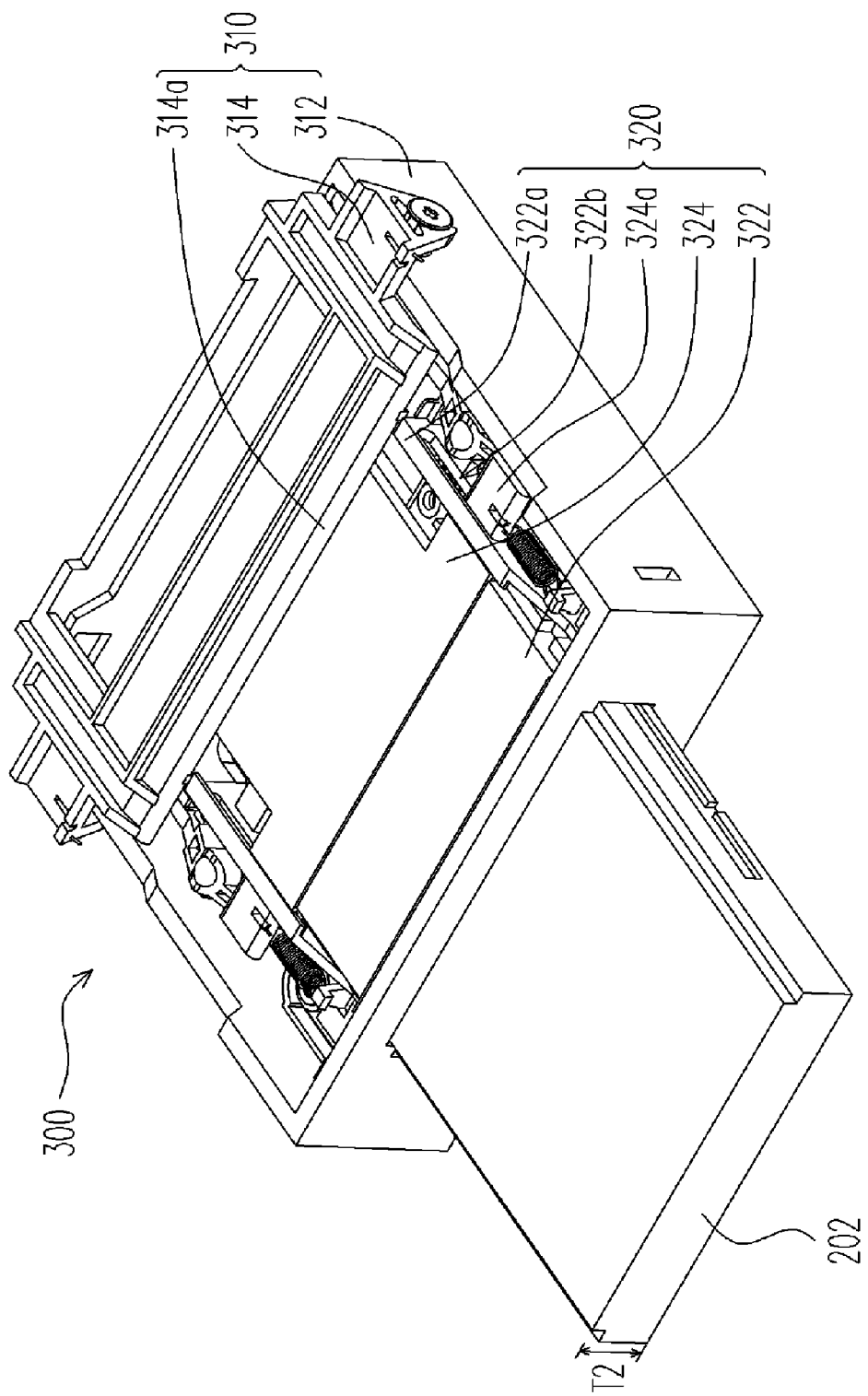
Figure 9C:
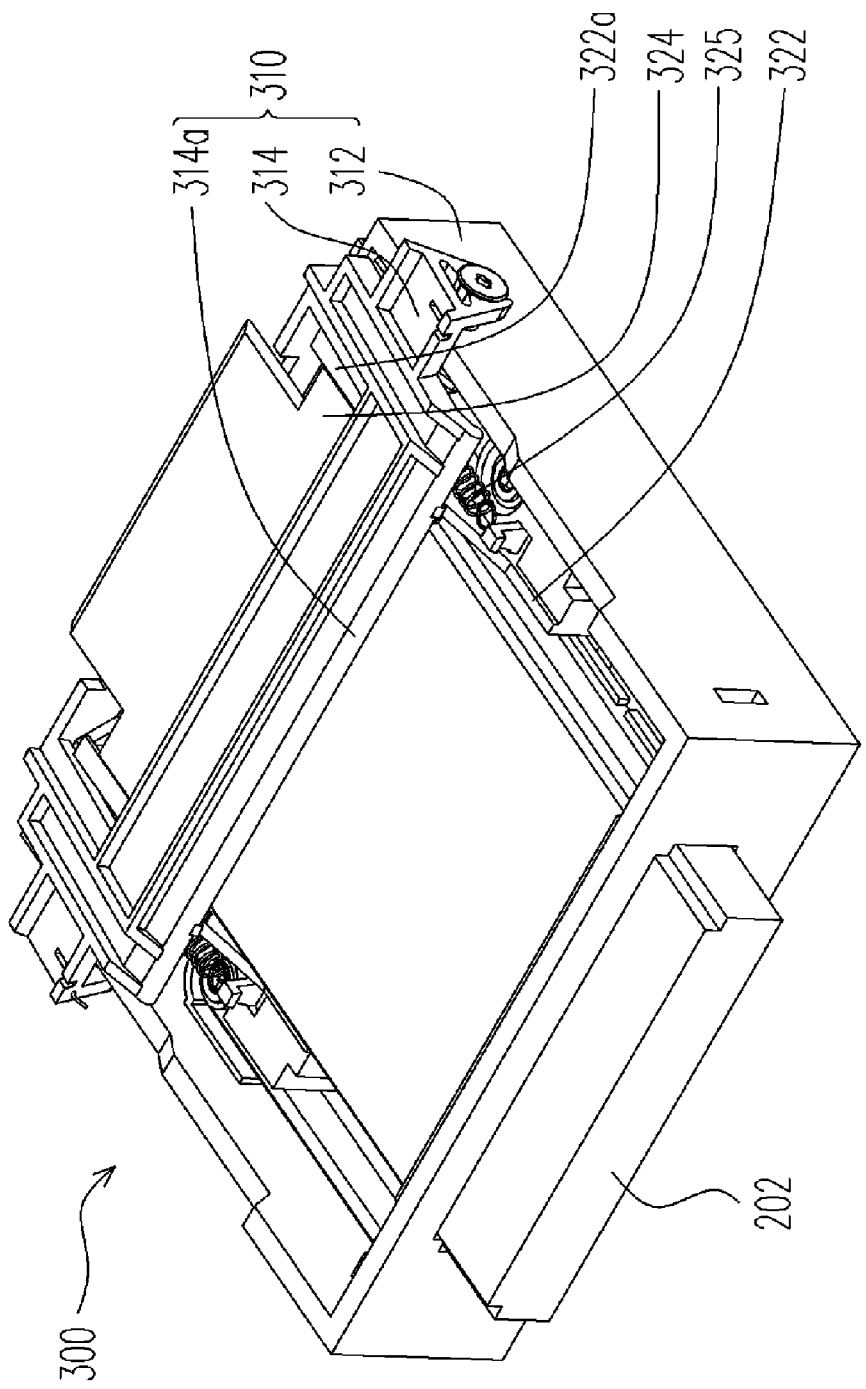
Figure 10A:
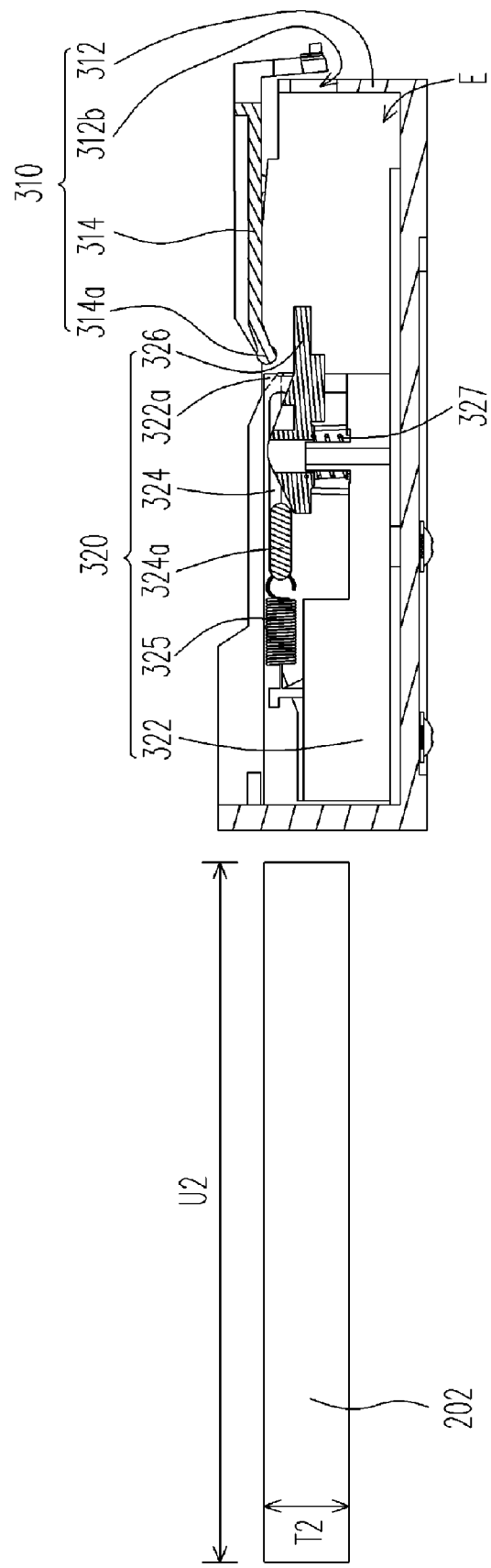
FIGS. 10A-10C are schematic cross-sectional views of FIGS. 9A-9C respectively.
Figure 10B:
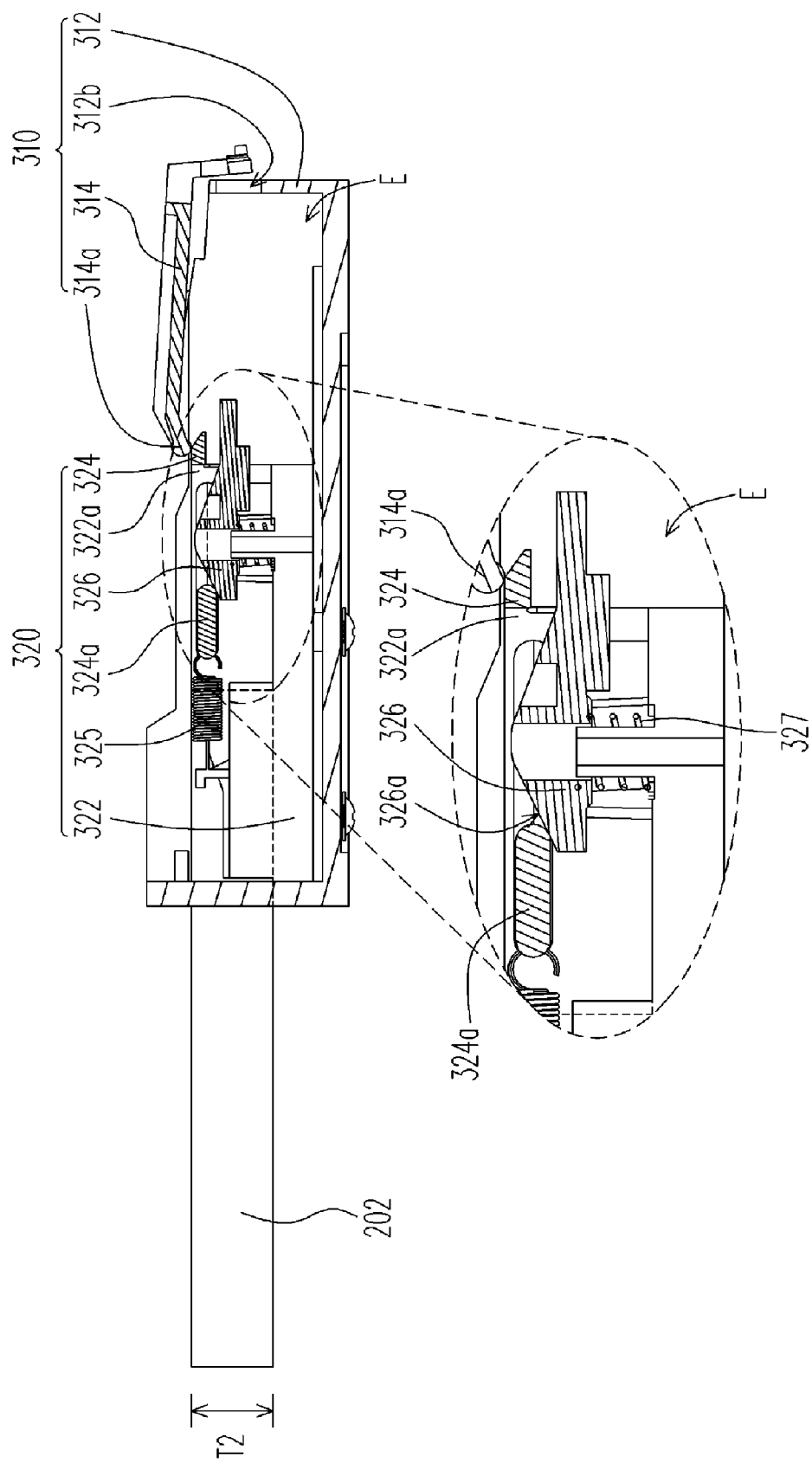
Figure 10C:
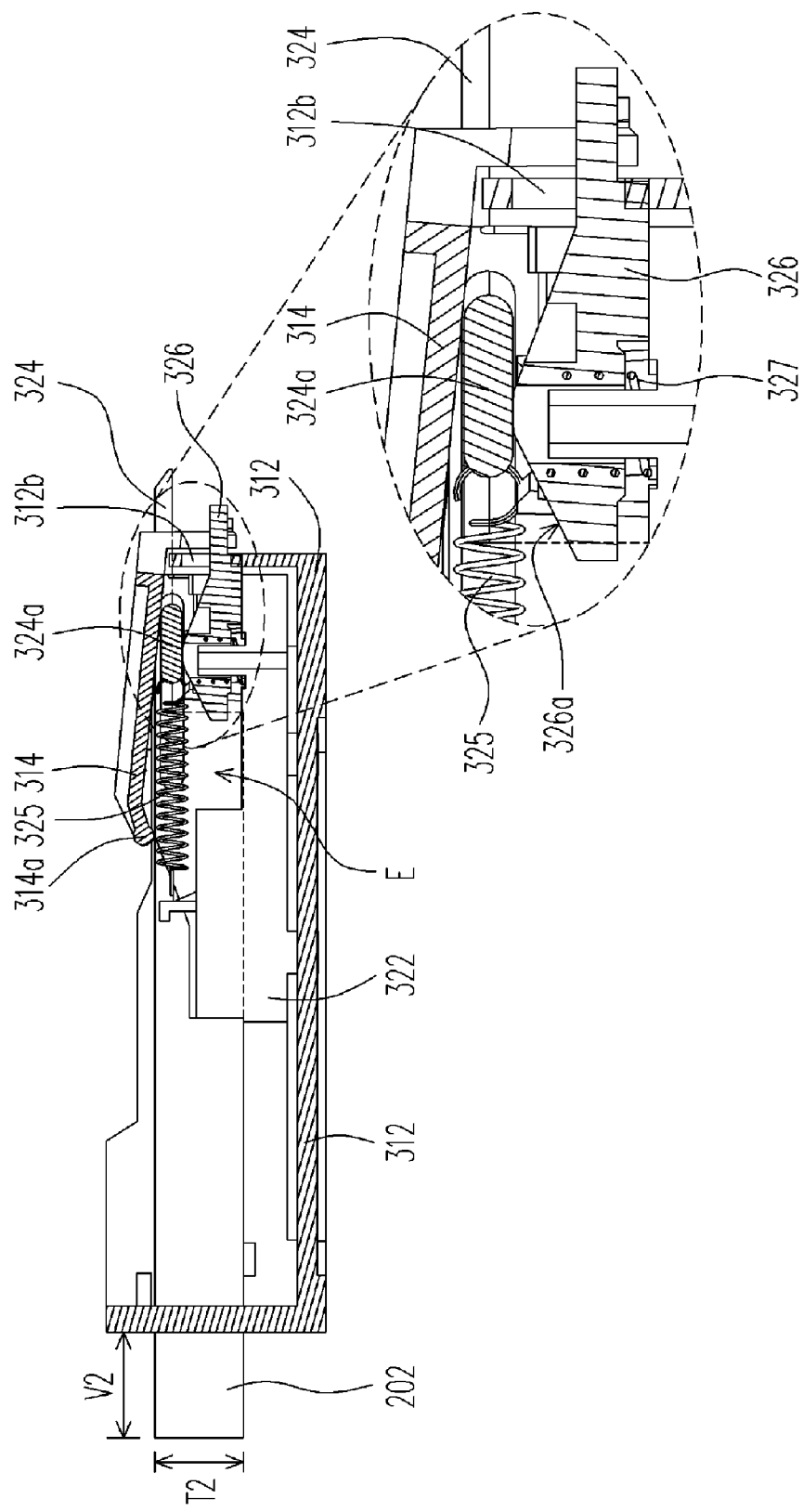

FIGS. 9A-9C are schematic flow charts when the storing mechanism of FIG. 3 is used to store the second hard disk, and FIGS. 10A-10C are schematic cross-sectional views of FIGS. 9A-9C respectively. Referring to FIG. 9A and FIG. 10A, the second hard disk 202 has a second thickness T2, which is larger than the first thickness T1 of the first hard disk 201 in FIG. 8A. In this embodiment, the second hard disk 202 is a removable hard disk with a specification of 2.5 inch. It should be mentioned that, not only the second thickness T2 of the second hard disk 202 is larger than the first thickness T1 of the first hard disk 201 in FIG. 7A, but the second length U2 of the second hard disk 202 is also larger than the first length U1 of the first hard disk 201 in FIG. 7A.

Then, referring to FIG. 9B and FIG. 10B, when the user applies a force to plug the second hard disk 202 into the storing mechanism 300, the second hard disk 202 is located on the tray 322 and is forced to move towards the slide 324 under the external force, and due to the second thickness T2 of the second hard disk 202, the second hard disk 202, under the external force, presses against and pushes the slide 324, thus, a connecting terminal (not shown) of the second hard disk 202 is coupled to the connector 400 on the tray 322 (as shown in FIG. 6B).

Next, referring to FIG. 9C and FIG. 10C, under the external force, the second hard disk 202, the tray 322 and the slide 324 are relatively moved for a preset distance on the base 312 (as shown in FIG. 10C). In other words, the second hard disk 202, the tray 322 and the slide 324 enter into the space E located at the rear half part of the base 312.

Figure 1:
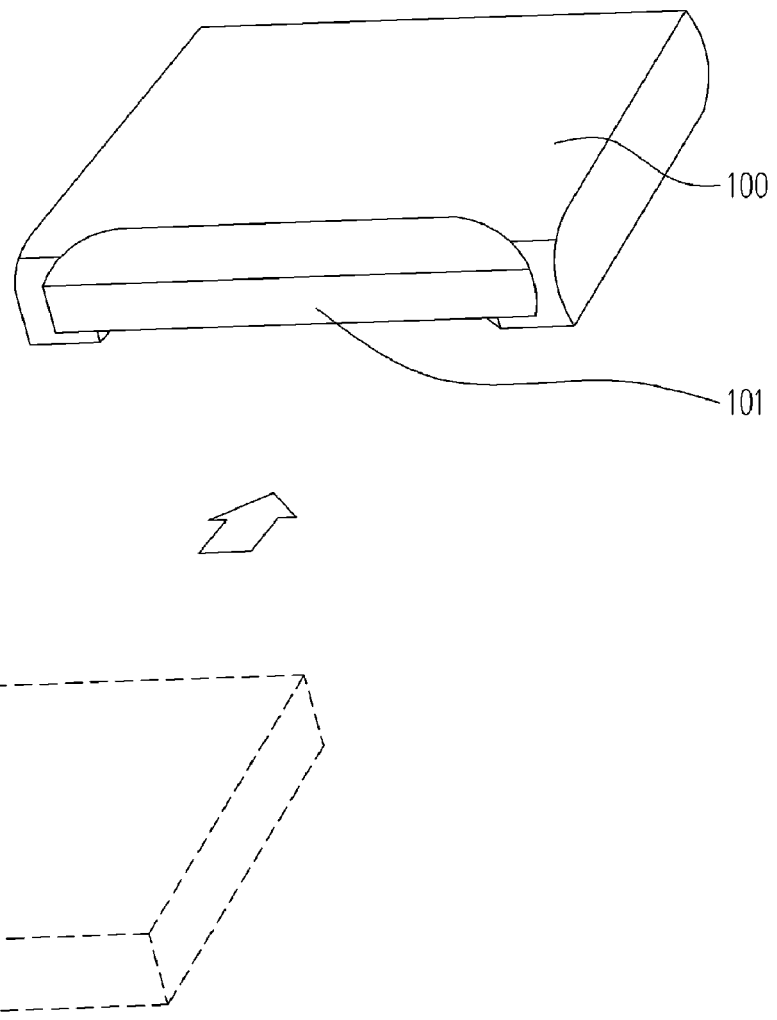
Figure 2:
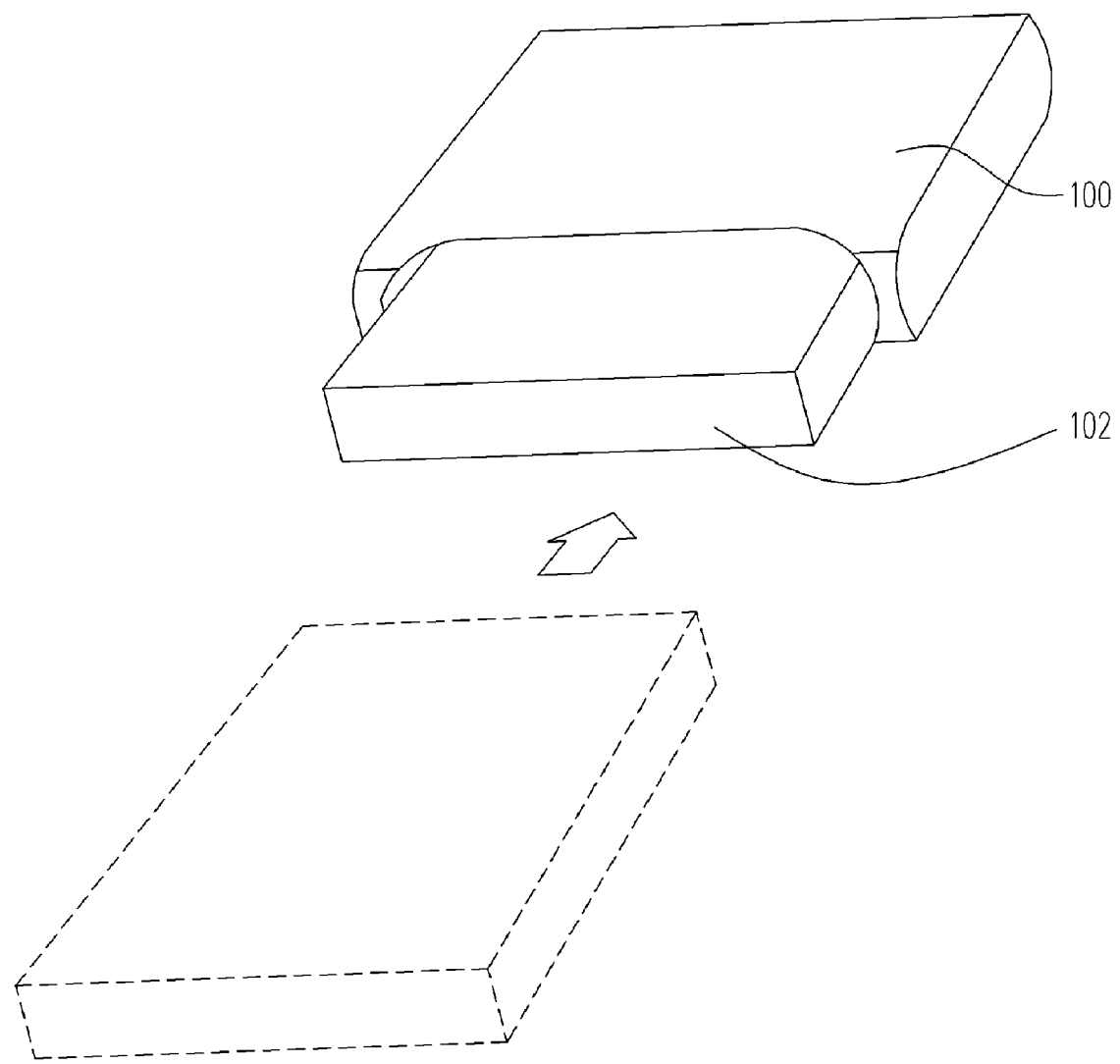
FIG. 2 is a schematic view of the storing box of FIG. 1 and a removable hard disk with the second specification.

It should be mentioned that, the second snapping portion 326 (as shown in the partial enlarged view of FIG. 10B) has a chamfer 326a, and the lugs 324a are used for pressing the second snapping portion 326 downwards along the chamfer 326a (as shown in the partial enlarged view of FIG. 1C). As a result, the fourth restoring element 327 is deformed and twisted, and the second snapping portions 326 are snapped to the first snapping portions 312b, such that the tray 322 is fixed on the base 312.

As clearly known from FIG. 10C, most part of the second hard disk 202 is located within the storing mechanism 300 and thereby being protected. It should be noted that, the length V1 of the part of the stored first hard disk 201 being exposed outside the storing mechanism 300 is substantially equal to the length V2 of the part of the stored second hard disk 202 being exposed outside the storing mechanism 300. In other words, the storing mechanism 300 of this embodiment stores the first hard disk 201 and the second hard disk 202 with different lengths, and makes both of them have the same exposed length.

On the contrary, when the user draws out the second hard disk 202 from the storing mechanism 300, the slide 324 is moved back to its original location under the restoring force provided by the third restoring element 325, and the lugs 324a are also moved back to the original location together with the slide 324. The pressure applied to the second snapping portions 326 is released, and the snapping between the second snapping portions 326 and the first snapping portions 312b is released, such that the second module 320 is moved back to the original location via the first restoring element 330 (as shown in FIG. 3). On the other aspect, the slide 324 leaves the position below the lever 314, and the leaned portion 314a of the lever 314 raised by the slide 324 moves back to the original location due to the moment M provided by the second restoring element 316.

To sum up, the present invention utilizes the thickness difference between different hard disks to make the base of the first module move or not move relative to the tray of the second module, thereby adjusting the depths for the hard disks with different thicknesses to enter into the storing mechanism of the present invention, thus, the lengths of the hard disks being exposed outside the storing mechanism are substantially the same. Therefore, the electronic device with the storing mechanism of the present invention is not only used for storing the hard disks with the different lengths, but also used for enhancing the beauty of the appearance and protecting most part of the hard disk.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A storing mechanism, suitable for being disposed within an electronic device, and used for storing a first hard disk with a first thickness, or storing a second hard disk with a second thickness, comprising:
   a first module, comprising:
      a base; and
      a lever, pivoted on the base, and having a leaned portion;
   a second module, comprising:
      a tray, having a stopper and glidingly disposed on the base corresponding to the leaned portion, for being limited to the leaned portion, so as to limit the shift of the tray relative to the base; and
      a slide, glidingly disposed on the tray; and
   a first restoring element, disposed between the base and the tray, for making the delocalized tray move back to the original location;
   wherein when the first hard disk is located on the tray and is forced to move towards the slide under an external force, the first thickness of the first hard disk makes the first hard disk enter into a space between the tray and the slide, and be coupled to a connector of the electronic device disposed on the tray;
   when the second hard disk is located on the tray and is forced to move towards the slide under an external force, due to the second thickness of the second hard disk, the second hard disk pushes the slide and is coupled to the connector, the slide pushed by the second hard disk raises the leaned portion of the lever, thereby releasing the limiting effect of the leaned portion to the stopper of the tray, thus, under the external force, the second hard disk, the tray and the slide move for a preset distance on the base.

2. The storing mechanism as claimed in claim 1, wherein the first restoring element is a constant force spring.

3. The storing mechanism as claimed in claim 1, wherein the length of the stored first hard disk being exposed outside the electronic device is substantially equal to that of the stored second hard disk being exposed out of the electronic device.

4. The storing mechanism as claimed in claim 1, wherein the first module further comprises:
   a second restoring element, disposed between the base and the lever, for making the delocalized lever move back to the original location.

5. The storing mechanism as claimed in claim 4, wherein the second restoring element is a spring.

6. The storing mechanism as claimed in claim 1, wherein the second module further comprises:
   a third restoring element, disposed between the tray and the slide, for making the delocalized slide move back to the original location.

7. The storing mechanism as claimed in claim 6, wherein the third restoring element is a spring.

8. The storing mechanism as claimed in claim 1, further comprising:
   a first snapping portion, disposed on the base;
   a second snapping portion, pivoted on the tray, suitable for being snapped to the first snapping portion after both the second hard disk and the tray have been forced to move for the preset distance under the external force; and
   a fourth restoring element, disposed between the tray and the second snapping portion, for making the delocalized second snapping portion move back to the original location.

9. The storing mechanism as claimed in claim 8, wherein the fourth restoring element is a spring.

* * * * *